United States Patent
Heo (10) Patent No.: US 11,891,180 B2
(45) Date of Patent: Feb. 6, 2024

(54) SEAT CONTROL SYSTEM OF AIR VEHICLE FOR URBAN AIR MOBILITY

(71) Applicants: Hyundai Motor Company, Seoul (KR); Kia Corporation, Seoul (KR)

(72) Inventor: Jin Hyuck Heo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 322 days.

(21) Appl. No.: 17/494,592

(22) Filed: Oct. 5, 2021

(65) Prior Publication Data
US 2022/0324576 A1    Oct. 13, 2022

(30) Foreign Application Priority Data
Apr. 13, 2021    (KR) .................. 10-2021-0047594

(51) Int. Cl.
*B64D 11/06*    (2006.01)
*B64C 27/08*    (2023.01)
*B64C 27/00*    (2006.01)

(52) U.S. Cl.
CPC ........ *B64D 11/0619* (2014.12); *B64C 27/006* (2013.01); *B64C 27/08* (2013.01); *B64D 11/0642* (2014.12); *B64D 11/0647* (2014.12); *B64D 11/06205* (2014.12)

(58) Field of Classification Search
CPC .......... B64D 11/0619; B64D 11/06205; B64D 11/0642; B64D 11/0647; B64D 11/0621; B64D 11/0646; B64D 2045/0085; B64C 27/006; B64C 27/08; B64C 29/0025; B64C 39/024
See application file for complete search history.

(56) References Cited

U.S. PATENT DOCUMENTS

2020/0180754 A1*   6/2020   Schonfelder ........... G01G 19/07

* cited by examiner

*Primary Examiner* — Jacob M Amick
*Assistant Examiner* — Charles J Brauch
(74) *Attorney, Agent, or Firm* — Fox Rothschild LLP (57) ABSTRACT

A seat control system of an air vehicle for urban air mobility (UAM)UAM is provided. When the air vehicle turns strongly to one side during rotor failure of the air vehicle for UAM, side pads and air cells prevent the head and the body of a passenger seated on a seat in the air vehicle from being sharply tilted to the one side. Additionally, air bags of the side pads prevent and cushion impact energy applied to the head of the passenger at the moment when the air vehicle lands on the ground.

15 Claims, 13 Drawing Sheets

FIG. 1

PRIOR ART

FIG. 2

PRIOR ART

FIG. 3

PRIOR ART

FIG. 4

PRIOR ART

FIG. 5

PRIOR ART

SEAT CONTROL SYSTEM OF AIR VEHICLE FOR URBAN AIR MOBILITY

CROSS REFERENCE TO RELATED APPLICATION

The present application claims priority to Korean Patent Application No. 10-2021-0047594, filed Apr. 13, 2021, the entire contents of which is incorporated herein for all purposes by this reference.

BACKGROUND

Field of the Disclosure

The present disclosure relates generally to a seat control system of an air vehicle for urban air mobility (UAM) and, more particularly, to a seat control system of an air vehicle for UAM capable of safely protect a passenger seated on a seat within the air vehicle during failure of a rotor of the air vehicle for UAM.

Description of the Related Art

Recently, the urban air mobility (UAM) for future transportation system is being researched and developed, and the R&D items for UAM includes a vertical take-off and landing (VTOL) air vehicle. As a type of the VTOL air vehicle, a drone-type VTOL air vehicle having multiple rotors for improved degree of freedom in flight and capable of taking off and landing in a narrow space may be applied. For example, the drone-type VTOL air vehicle having the multiple rotors includes a quadcopter drone or a quadrotor drone having at least four rotors, and the quadcopter drone or the quadrotor drone may be applied as the VTOL air vehicle for UAM.

The flight principle of the drone-type VTOL air vehicle having at least four rotors will be described with reference to FIGS. 1 to 5 of the prior art as follows. The at least four rotors included in the VTOL air vehicle consists of a first rotor 10 and a second rotor 20 arranged at the front left and right of the air vehicle, and a third rotor 30 and a fourth rotor 40 arranged at the rear left and right of the air vehicle, and the first rotor 10 and the fourth rotor 40 are arranged diagonally to each other and the second rotor 20 and the third rotor 30 are arranged diagonally to each other.

Figure 1:
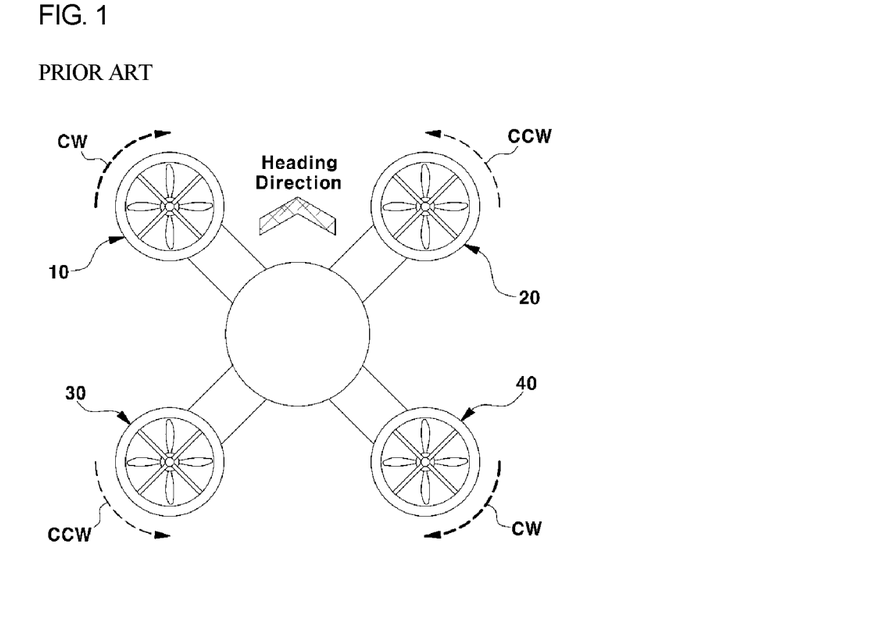
FIGS. 1 to 5 are schematic views showing flight principle of a drone-type VTOL air vehicle having multiple rotors according to the prior art.

Referring to FIG. 1, for taking-off and landing and flight of the VTOL air vehicle, the first rotor 10 and the fourth rotor 40 rotate clockwise (CW) and the second rotor 20 and the third rotor 30 rotate counterclockwise (CCW), and forward and backward movements, lateral movement, etc. of the VTOL air vehicle may be performed by adjusting rotational velocity and the direction of each rotor.

Figure 2:
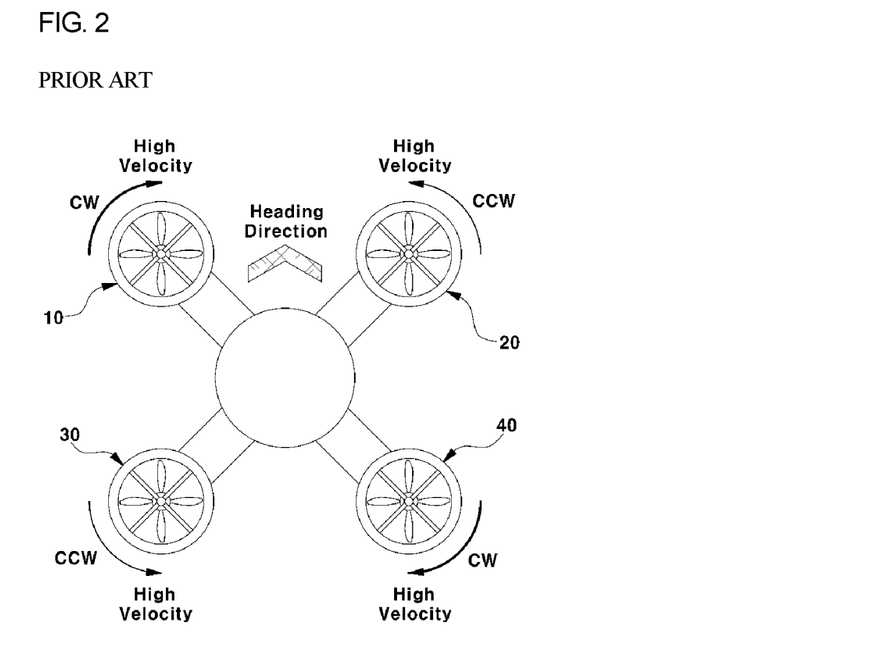
Figure 3:
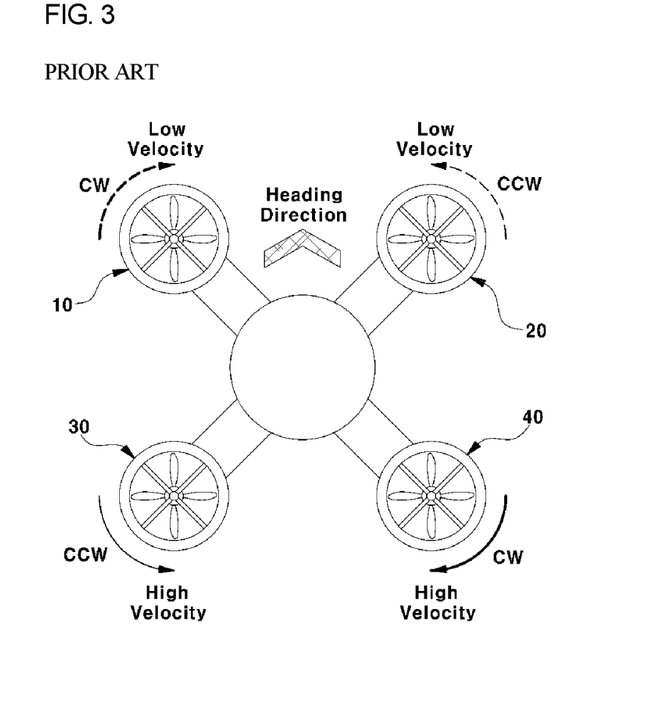

For example, when the VTOL air vehicle rises, as shown in FIG. 2, the first rotor 10 and the fourth rotor 40 rotate CW at high velocity and simultaneously the second rotor 20 and the third rotor 30 rotate CCW at high velocity. When the VTOL air vehicle moves forward, as shown in FIG. 3, the first rotor 10 and the second rotor 20 rotate at low velocity and simultaneously the third rotor 30 and the fourth rotor 40 rotate at high velocity.

Figure 4:
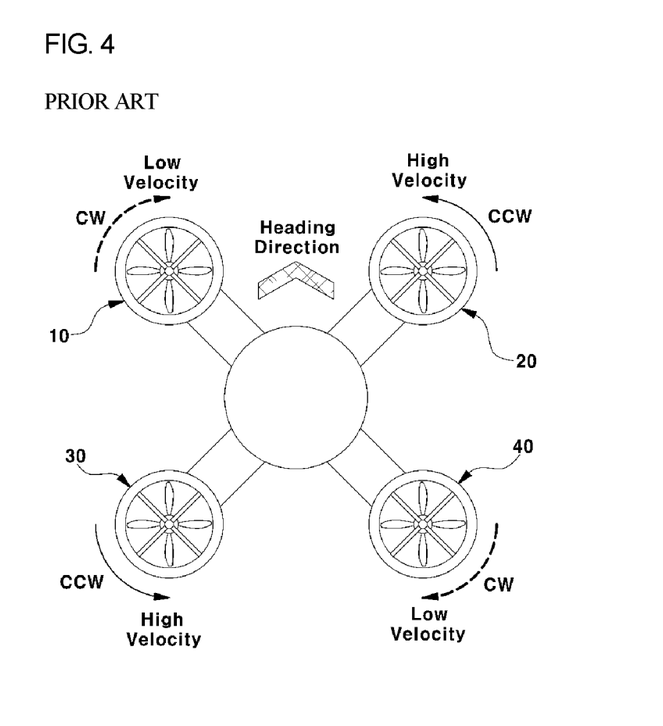
Figure 5:
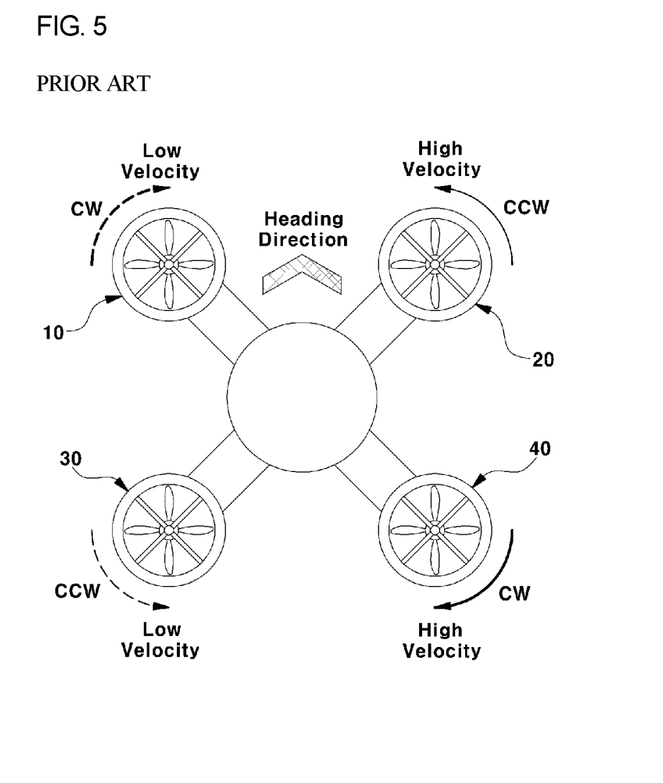

When the VTOL air vehicle turns to the right, as shown in FIG. 4, the first rotor 10 and the fourth rotor 40 rotate CW at low velocity and simultaneously the second rotor 20 and the third rotor 30 rotate CCW at high velocity. When the VTOL air vehicle moves to the left, as shown in FIG. 5, the first rotor 10 and the third rotor 30 rotate at low velocity and simultaneously the second rotor 20 and the fourth rotor 40 rotate at high velocity.

In addition, forward and backward acceleration of the VTOL air vehicle is controlled by forward pitching or backward pitching of the air vehicle while adjusting the lift of the front rotors (first rotor and second rotor) or the rear rotors (third rotor and fourth rotor), lateral acceleration of the VTOL air vehicle is controlled by left roll or right roll of the air vehicle while adjusting the lift of the left rotors (first rotor and third rotor) or the right rotors (second rotor and fourth rotor), yaw movement (turning movement) of the vertical takeoff and landing air vehicle is controlled using airframe moment in response to difference between velocities of the rotors that are arranged diagonally.

Figure 6:
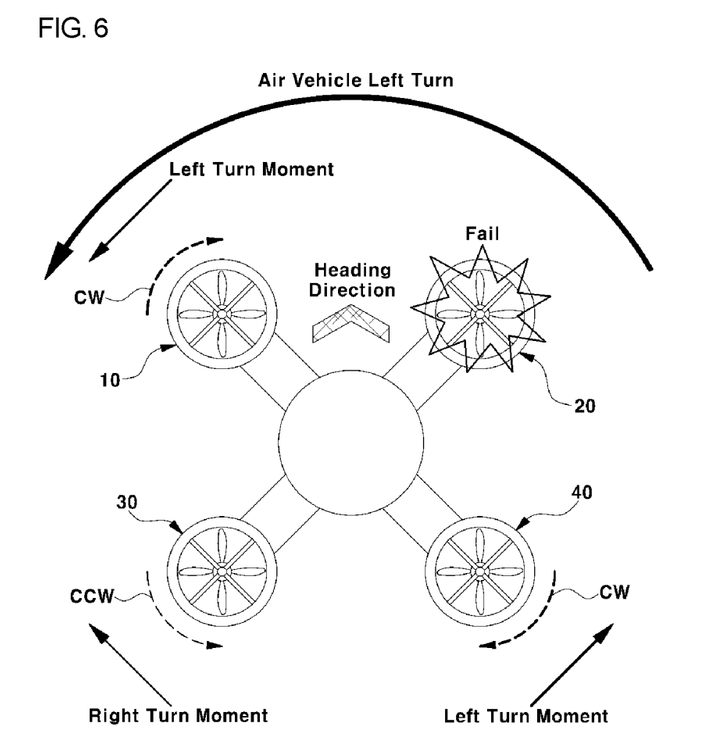
FIG. 6 is a schematic view showing principle that the air vehicle turns to the left when a rotor of the VTOL air vehicle is broken.

As described above, the drone-type VTOL air vehicle for UAM does not crash immediately after losing the lift during a drive device (rotor, motor, etc.), but when the air vehicle makes an emergency landing in a failure situation, the air vehicle (airframe) loses the moment and turns strongly to one side due to the moment asymmetry caused by the rotational force asymmetry of each rotor. For example, referring to FIG. 6, the second rotor 20 of the VTOL air vehicle is broken, the left-turn moments of the first rotor 10 and the fourth rotor 40 rotating CW is greater than the right-turn moment of the third rotor 30 rotating CCW and thus, the air vehicle turns strongly to the left.

Figure 7:
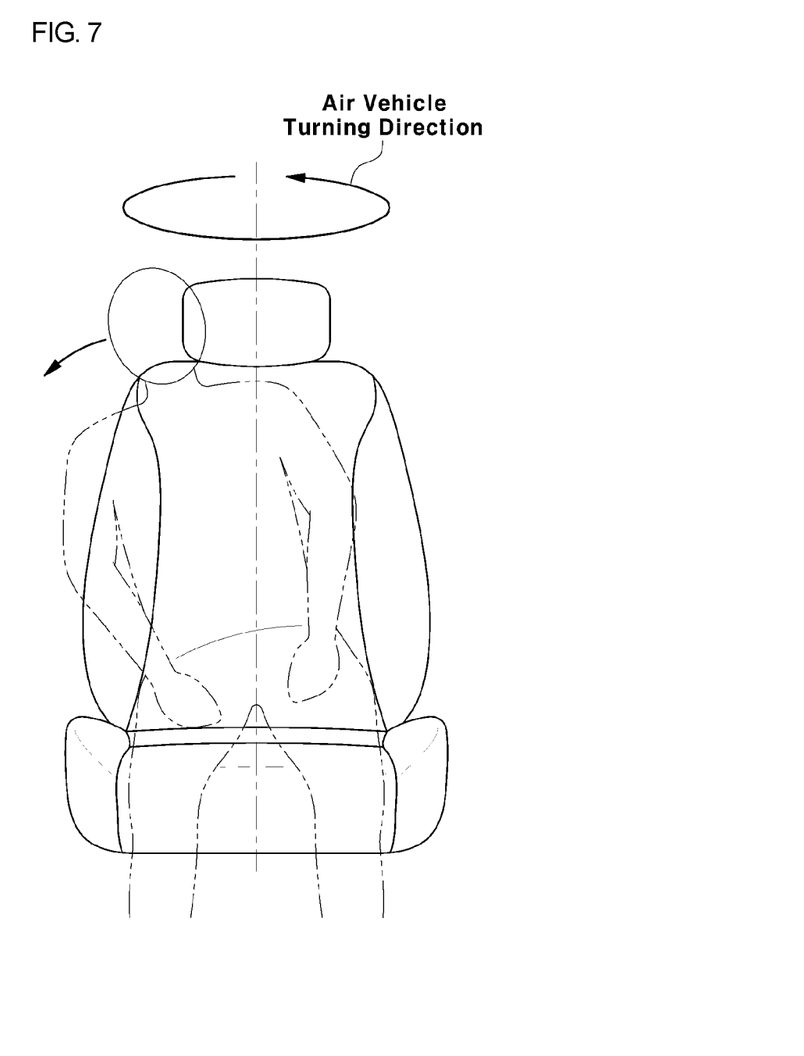
FIG. 7 is a schematic view showing a situation that a passenger seated on a seat in the VTOL air vehicle is tilted to the right when the air vehicle turns to the left due to rotor failure of the VTOL air vehicle.

As described above, when the air vehicle turns strongly to one side (e.g.: left turn), as shown in FIG. 7, the body of a passenger seated on a seat in the air vehicle is tilted to the right by centrifugal force generated in proportion to the yaw rate of the air vehicle. Therefore, when the drive device included in the drone-type VTOL air vehicle is broken, the yaw moment of the air vehicle (airframe) is generated to cause one-way turning of the air vehicle, and the head and the body of the passenger seated on the seat in the air vehicle are sharply tilted to one side (e.g., right side) as shown in FIG. 7, thus increasing the risk of injuries to the neck and the head of the passenger.

Figure 8:
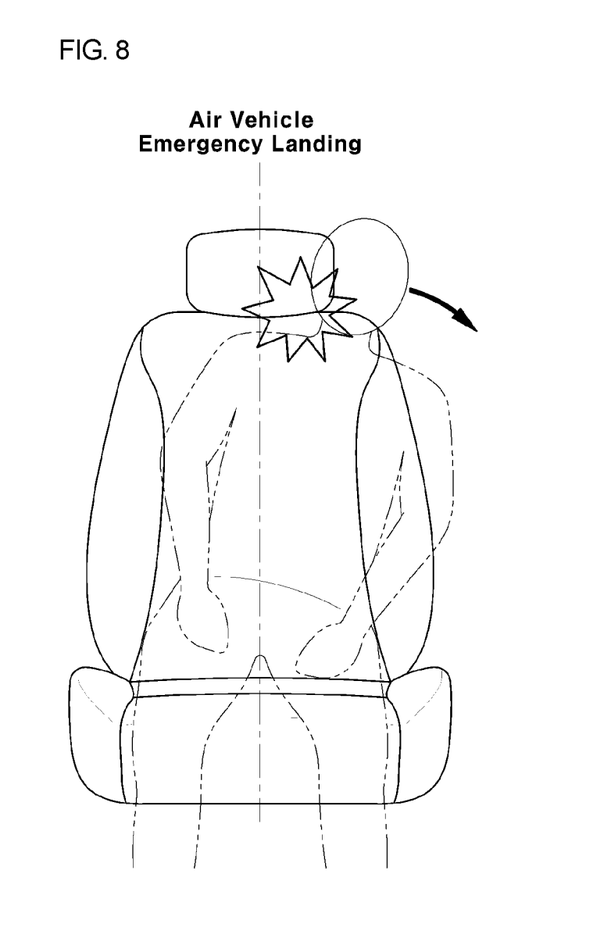
FIG. 8 is a schematic view showing the passenger seated on the seat in the VTOL air vehicle, wherein the passenger is tilted to the left and receives impact energy during an emergency landing of the VTOL air vehicle due to the rotor failure.

As shown in FIG. 8, when the air vehicle attempts an emergency landing and lands on the ground through minimum risk maneuver (MRM) control, the body and the head of the passenger lean to the left while having a large acceleration by sharply changing the yaw rate. Therefore, at the moment when the strongly turned air vehicle (airframe) lands on the ground during an emergency landing of the VTOL air vehicle due to drive device failure, as shown in FIG. 8, the head and the body of the passenger seated on the seat in the air vehicle are sharply tilted to an opposite side (e.g., left side) and simultaneously great impact energy is directly transmitted to the head and the body of the passenger from a reverse direction of turn of the air vehicle, so there is a problem that injuries may be greatly increased.

SUMMARY

Accordingly, the present disclosure has been made keeping in mind the above problems occurring in the related art, and the present disclosure is intended to propose a seat control system of an air vehicle for UAM, which is capable of preventing the head and body of a passenger seated on a seat within the air vehicle from being sharply tilted to one side by using side pads and air cells when a rotor of the air vehicle for UAM is broken and the air vehicle turns strongly to one side, and furthermore, of preventing and cushioning impact energy applied to the head of the passenger by using airbags of the side pads when the air vehicle lands on the ground.

In order to achieve the above objective, the seat control system of an air vehicle for UAM of the present disclosure, the air vehicle including multiple rotors, may include: a seat mounted in the air vehicle for UAM; a plurality of air cells embedded in the seat to be expandable; a first side pad connected to a left portion of a headrest of the seat and configured such that rectilinear reciprocating motion thereof in left and right directions may be performed; a second side pad connected to a right portion of the headrest and configured such that rectilinear reciprocating motion thereof in left and right directions may be performed; a first airbag embedded in the first side pad to be unfoldable; a second airbag embedded in the second side pad to be unfoldable; and a controller configured to perform expansion control for the plurality of air cells, moving control for the first side pad or the second side pad, and unfolding control for the first airbag or the second airbag.

The plurality of air cells may include: a first air cell and a second air cell respectively embedded in left and right bolster portions of a seatback; and a third air cell and a fourth air cell respectively embedded in left and right bolster portions of a seat cushion. Preferably, an air pump may be connected to the plurality of air cells, the air pump being configured to be operated by a command signal of the controller.

A first actuator may be embedded in a first side portion of the headrest and connected to the first side pad, the first actuator being configured to pull the first side pad toward a head portion of a passenger during rotor failure. A second actuator may be embedded in a second side portion of the headrest and connected to the second side pad, the second actuator being configured to pull the second side pad toward a head portion of a passenger during rotor failure.

The controller may include: a rotor failure determination part configured to determine whether at least one of the multiple rotors is in a failure condition based on present flight information of the air vehicle; a side pad position control part configured to determine a direction of turn of the air vehicle during rotor failure and to operate the first side pad or the second side pad to move toward a head portion of a passenger; an air cell volume control part configured to output a command signal for expansion of each air cell to an air pump during rotor failure; and an airbag unfolding control part configured to execute unfolding of the first airbag or the second airbag during an emergency landing due to rotor failure.

The rotor failure determination part may be configured to determine that some rotors of the multiple rotors may be in the failure condition, when a steering angle for flight of the air vehicle is less than a reference steering angle, velocity of the some rotors of the multiple rotors is less than a reference value, and yaw rate of the air vehicle is higher than a reference.

The side pad position control part may be configured to control a drive amount of a first actuator for pulling the first side pad positioned at right of a head portion of the passenger to cause the first side pad to move in a left direction toward a right side of the head portion of the passenger, when the side pad position control part determines that the air vehicle turns to the left due to failure of any one of the multiple rotors.

The side pad position control part may be configured to control a drive amount of a second actuator for pulling the second side pad positioned at left of a head portion of the passenger to cause the second side pad to move in the right direction toward a left side of the head of the passenger, when the side pad position control part determines that the air vehicle turns to the right due to failure of any one rotor of the multiple rotors.

The air cell volume control part may be configured to receive a rotor failure signal from the rotor failure determination part to determine expansion pressure of first to fourth air cells in proportion to yaw rate, and to output a driving signal for expanding the first to fourth air cells to the air pump. The airbag unfolding control part may be configured to receive a rotor failure signal from the rotor failure determination part to determine during an air vehicle emergency landing, and then to operate the first airbag or the second airbag to be unfolded toward the head portion of the passenger.

Through the technical solution as described above, the present disclosure provides effects as follows.

First, when the air vehicle turns strongly to one side during the rotor failure of the air vehicle for UAM, the first and second side pads connected to the headrest prevent the head of the passenger seated on the seat in the air vehicle from being sharply tilted to the one side and the air cells restrain the body of the passenger while being expanded, to prevent the passenger from sustaining injuries caused by the head portion and by the body of the passenger being sharply tilted to the one side.

Second, at the moment when the air vehicle turns strongly to one side and emergency-lands on the ground during the rotor failure of the air vehicle for UAM, the air bags embedded in the side pads are unfolded to prevent and cushion impact energy applied to the head portion of the passenger during an emergency landing, to prevent the passenger from sustaining injuries to the head portion due to impact energy during an emergency landing.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, an exemplary embodiment of the present disclosure will be described in detail with reference to accompanying drawings.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 9:
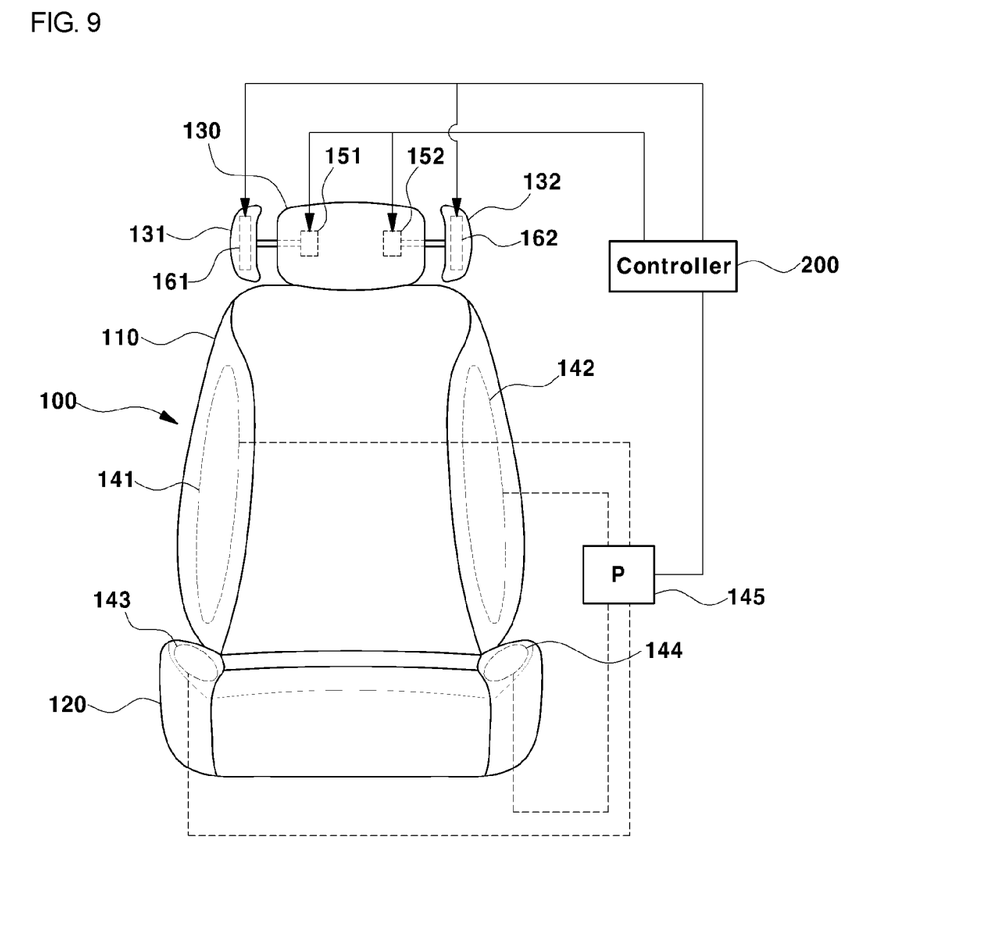
FIGS. 9 and 10 are views showing structures of the seat of the air vehicle for UAM according to the present disclosure and a control system thereof.
Figure 10:
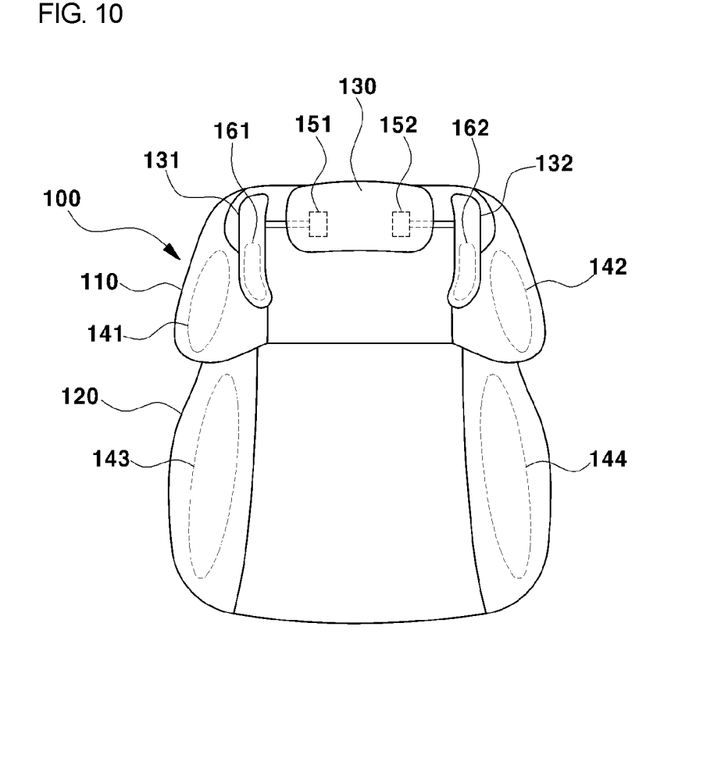

FIGS. 9 and 10 are views showing structures of a seat of an air vehicle for UAM according to the present disclosure and a control system thereof.

As shown in FIGS. 9 and 10, the seat 100 may be mounted in the drone-type VTOL air vehicle for UAM having multiple rotors, and like a general seat for a conventional automobile, the seat 100 includes a seatback 110 supporting an upper body (back and waist) of a passenger, a seat cushion 120 supporting a lower body (bottom and tights) of the passenger, and a headrest 130 supporting a head portion (head and neck) of the passenger.

A plurality of air cells is embedded in the seat 100, and the plurality of air cells is configured to be expanded during rotor failure of the VTOL air vehicle and to surround and support the passenger's upper and lower body to prevent the passenger's upper and lower body from tilting to one side. Preferably, a first air cell 141 and a second air cell 142 are respectively embedded in left and right bolster portions of the seatback 110 to be expandable, and a third air cell 143 and a fourth air cell 144 are respectively embedded in left and right bolster portions of the seat cushion 120 to be expandable.

The first to fourth air cells 111 to 114 are operated to be expanded during the rotor failure in the VTOL air vehicle, and are configured to surround and support left and right upper body portions and the left and right lower body portions of the passenger, to prevent the upper and lower body from being tilted to one side. The first to fourth air cells 111 to 114 are connected to an air pump 145 configured to supply air for expanding the air cells, and the air pump 145 may be operated by a command signal of the controller 200 and supplies air to the first to fourth air cells 111 to 114 for expansion.

Specifically, a first side pad 131 and a second side pad 132 for preventing and cushioning diagonally tilting of the head portion of the passenger to one side during the rotor failure of the VTOL air vehicle are respectively connected to left and right portions of the headrest 130, and the first side pad 131 and the second side pad 132 are configured such that reciprocating motion thereof in left and right directions may be performed. Therefore, a first actuator 151 is embedded in a first side portion of the headrest 130 and is connected to the first side pad 131 to pull the first side pad 131 toward the passenger's head portion during the rotor failure, and a second actuator 152 is embedded in a second side portion of the headrest 130 and is connected to the second side pad 132 to pull the second side pad 132 toward the passenger's head portion during the rotor failure. Preferably, the first actuator 151 and the second actuator 152 may be a driving means such as a linear motor, solenoid, etc. for allowing an output shaft to reciprocate linearly.

When the first actuator 151 is driven with an output shaft of the first actuator 151 connected to the first side pad 131, reciprocating movement of the first side pad 131 in left and right directions may be performed, and when the second actuator 152 is driven with an output shaft of the second actuator 152 connected to the second side pad 132, reciprocating movement of the second side pad 132 in the left and right directions may be performed.

A first airbag 161 and a second airbag 162 are respectively embedded in the first side pad 131 and the second side pad 132, and the first and second airbags 161 and 162 may be unfolded toward the head portion of the passenger supported to the headrest 130 by a control signal of the controller 200. Preferably, the first airbag 161 or the second airbag 162 may be unfolded toward the passenger's head portion by a control signal of the controller 200 to absorb and cushion great impact applied to the passenger's head portion during an emergency landing due to the rotor failure of the VTOL air vehicle.

Figure 11:
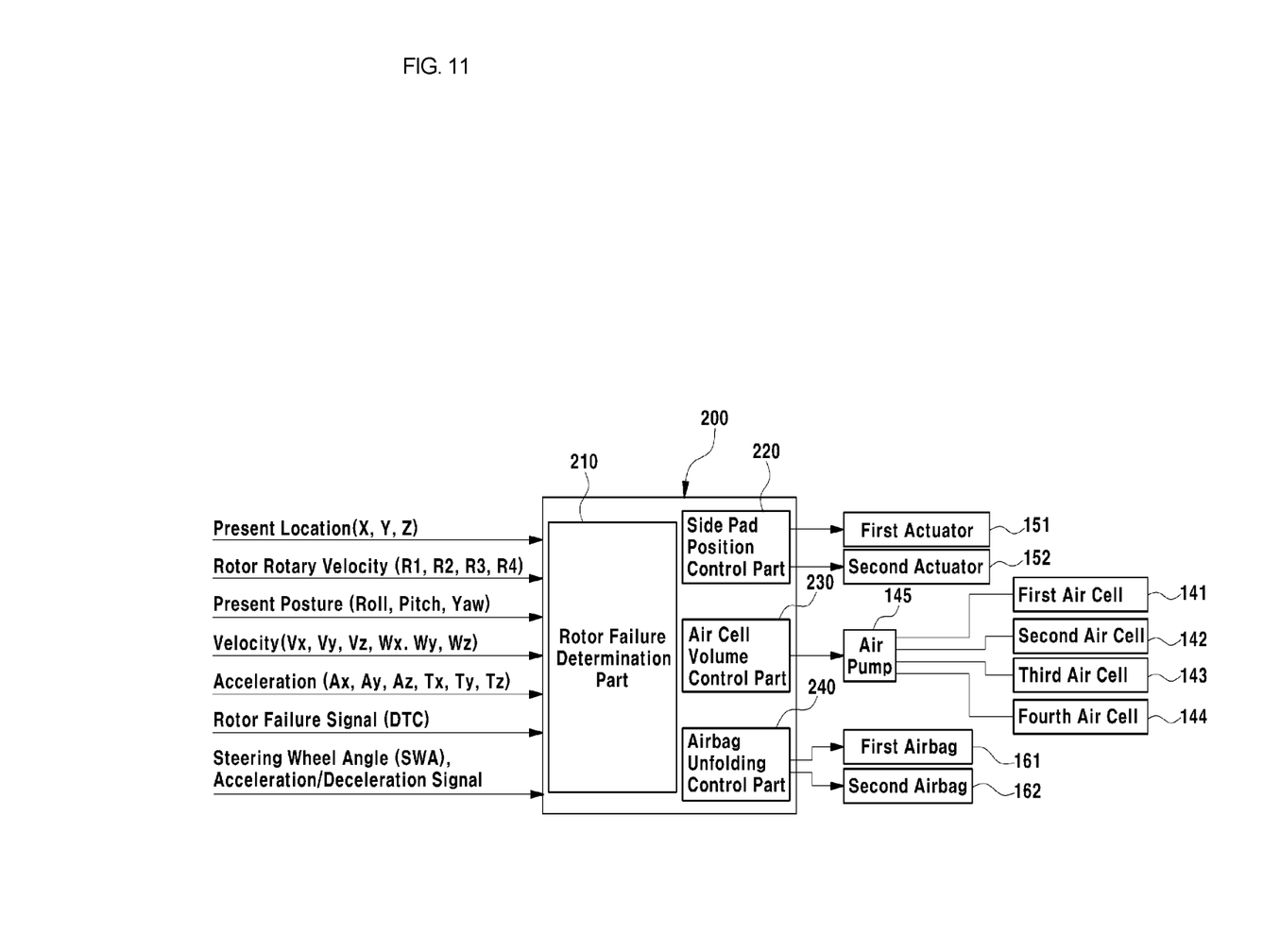
FIG. 11 is a control block diagram showing the seat control system of an air vehicle for UAM according to the present disclosure.

FIG. 11 is a control block diagram showing the seat control system of an air vehicle for UAM according to the present disclosure. The controller 200 may be configured to perform expansion control for the plurality of air cells 111 to 114, moving control for the first side pad 131 or the second side pad 132, and unfolding control for the first airbag 161 or the second airbag 162.

As shown in FIG. 11, the controller 200 may include a rotor failure determination part 210 configured to determine whether at least one of the multiple rotors (e.g., first to fourth rotors) is in a failure condition based on present flight information of the VTOL air vehicle, a side pad position control part 220 configured to determine a direction of turn of the air vehicle during the rotor failure and to operate one of the first side pad 131 and the second side pad 132 to move toward the passenger's head portion, an air cell volume control part 230 configured to output the command signal for expanding the first to fourth air cells 111 to 114 during the rotor failure, and an airbag unfolding control part 240 configured to execute expansion of the first airbag 161 or the second airbag 162 during an emergency landing due to the rotor failure.

For example, the present flight information of the VTOL air vehicle may be detected by various sensors, and present position (X, Y, Z) of the air vehicle, rotational velocity (RV1, RV2, RV3, RV4) of the first to fourth rotors, present posture (roll value, pitch value, yaw rate) of the air vehicle, velocity (Vx, Vy, Vz, Wx, Wy, Wz) of the air vehicle, acceleration (Ax, Ay, Az, Tx, Ty, Tz) of the air vehicle, a rotor failure signal, steering angle (SWA), acceleration and deceleration signal, etc. may be input to the controller 200. The rotor failure determination part 210 in the elements of the controller 200 may be configured to determine that some rotors of the multiple rotors are in the failure condition, in response to determining that velocity of the some rotors of the multiple rotors is less than a reference value for a predetermined time and yaw rate of the air vehicle is greater than a reference value with a state in which steering input for flight of the air vehicle (state in which steering angle is less than reference steering angle).

For example, the rotor failure determination part 210 may be configured to determine that at least one of the multiple rotors is broken for allowing the air vehicle (airframe) to turn strongly in one direction, in response to determining that steering angle (SWA) for flight of the air vehicle is less than reference steering angle ($SWA_{Threshold}$) ($SWA<SWA_{Threshold}$), first rotor velocity (RV1) is less than reference velocity ($RV_{Threshold}$) ($RV1<RV_{Threshold}$), second rotor velocity (RV2) is less than the reference velocity ($RV_{Threshold}$) ($RV2_{Threshold}$), third rotor velocity (RV3) is less than the reference velocity ($RV_{Threshold}$) ($RV2<RV_{Threshold}$), fourth rotor velocity (RV4) is less than the reference velocity ($RV_{Threshold}$) ($RV4<RV_{Threshold}$), and present yaw rate (AVz) is greater than the reference value ($AVz_{Threshold}$) ($AVz>AVz_{Threshold}$).

The side pad position control part 220 in the elements of the controller 200 may be configured to determine whether the air vehicle turns in the left direction or the right direction by failure of the at least one of the multiple rotors (e.g., first to fourth rotors), and to operate one of the first side pad 131 and the second side pad 132 to move toward the passenger's head portion in proportion to yaw rate change rate. The side pad position control part 220 may be configured to receive the rotor failure signal from the rotor failure determination part 210 and determine whether the direction of turn of the air vehicle is the left direction or the right direction, and then adjust a drive amount of the first actuator 151 for pulling the first side pad 131 to the passenger's head portion or adjust a drive amount of the second actuator 152 for pulling the second side pad 132 to the passenger's head portion.

For example, when the side pad position control part 220 determines that the air vehicle turns to the left due to failure of any one of the multiple rotors, the side pad position control part 220 may be configured to adjust the drive amount of the first actuator 151 pulling the first side pad 131 positioned at left of the head portion of the passenger seated on the seat, to cause the first side pad 131 to move in the left direction to face a right portion of the passenger's head. On the other hand, when the side pad position control part 220 determines that the air vehicle turns to the right due to failure of any one of the multiple rotors, the side pad position control part 220 may be configured to adjust the drive amount of the second actuator 152 pulling the second side pad 132 positioned at left of the head portion of the passenger seated on the seat, to cause the second side pad 132 to move in the right direction to face a left portion of the passenger's head.

Preferably, the side pad position control part 220 may be configured to determine moving distances of the first side pad 131 and the second side pad 132 by using maximum moving distances ($D_{max}$) of the first side pad 131 and the second side pad 132 and maximum yaw rate ($Avz_{max}$), present yaw rate (Avz), and gain ($K_{Avz}$) for nonlinear tuning, and adjust the drive amounts of the first actuator 151 and the second actuator 152 in response to the determined moving distances.

For example, the side pad position control part 220 may be configured to determine that the air vehicle turns to the left due to the rotor failure when the yaw rate (Avz) has a positive value (Avz>0), and then determine a leftward moving distance ($D_R$) of the first side pad 131 positioned at right of the passenger's head portion as a value obtained by multiplying a value ($Avz/Avz_{max}$) obtained by dividing the present yaw rate by the maximum yaw rate, the gain ($K_{Avz}$), and a maximum moving distance ($D_{max}$).

Meanwhile, the side pad position control part 220 may be configured to determine that the air vehicle turns to the right due to the rotor failure when the yaw rate (Avz) has a negative value (Avz<0), and then determine a rightward moving distance ($D_L$) of the second side pad 132 positioned at left of the passenger's head portion as a value obtained by multiplying a value ($Avz/Avz_{max}$) obtained by dividing the present yaw rate by the maximum yaw rate, the gain ($K_{Avz}$), and the maximum moving distance ($D_{max}$).

Accordingly, as the first side pad 131 or the second side pad 132 moves toward the head portion of the passenger and is brought into close contact therewith when the air vehicle turns strongly to the left or the right due to the rotor failure, it is possible to prevent the passenger's head portion from being sharply tilted in one direction thereby preventing the passenger from suffering an injury due to twisting of the head and neck portion.

The air cell volume control part 230 may be configured to receive the rotor failure signal from the rotor failure determination part 210, to thus determine expansion pressure of the first to fourth air cells 111 to 114 in proportion to the yaw rate, and to output a drive signal for expanding the first to fourth air cells 111 to 114 to the air pump 145. For example, the air cell volume control part 230 may be configured to determine the expansion pressure ($P_n$) of the first to fourth air cells 111 to 114 as a value obtained by multiplying a value ($Avz/Avz_{max}$) obtained by dividing the present yaw rate by the maximum yaw rate, gain ($K_{Pn}$) for tuning, and maximum expansion pressure ($P_{max}$) of the air cells.

As the air cell volume control part 230 adjusts a drive amount of the air pump 145 in response to the expansion pressure as determined above, the first to fourth air cells 111 to 114 may be expanded by the determined expansion pressure. Accordingly, when the air vehicle turns strongly to the left or the right due to the rotor failure, the first air cell 141 and the second air cell 142 embedded in the left and right bolster portions of the seatback 110 may be expanded and simultaneously the third air cell 143 and the fourth air cell 144 embedded in the left and right bolster portions of the seat cushion 120 may be expanded, whereby the passenger's upper and lower body may be restrained not to be tilted to one side and injuries caused when the passenger's upper and lower body are sharply tilted to one side may be prevented.

The airbag unfolding control part 240 may be configured to receive the rotor failure signal from the rotor failure determination part 210, to determine the moment when the air vehicle performs an emergency landing, and to execute unfolding of the first airbag 161 or the second airbag 162.

For the above purpose, the airbag unfolding control part 240 may be configured to determine whether the air vehicle performs an emergency landing based on the yaw rate (Avz), rotary angular acceleration (Tz) of the air vehicle, angular acceleration jerk (jerk, ΔTz) that is instantaneous change rate of angular acceleration, lateral acceleration (Ay) of the air vehicle, lateral acceleration jerk (ΔAy) that is instantaneous change rate of lateral acceleration, etc.

For example, when the present yaw rate (Avz) is greater than preset reference yaw rate ($Avz_{spin}$), present rotary angular acceleration (Tz) is greater than preset reference angular acceleration ($Tz_{Threshold}$), present angular acceleration jerk (ΔTz) is greater than preset reference angular acceleration jerk ($\Delta Tz_{Threshold}$), present lateral acceleration (Ay) is greater than preset reference lateral acceleration ($Ay_{Threshold}$), present lateral acceleration jerk (ΔAy) is greater than preset lateral acceleration jerk ($\Delta Ay_{Threshold}$), the airbag unfolding control part 240 may be configured to determine a present point as the moment when the air vehicle performs an emergency landing.

Accordingly, during an emergency landing due to the rotor failure of the air vehicle, the first airbag 161 embedded in the first side pad 131 or the second airbag 162 embedded in the second side pad 132 may be unfolded toward the passenger's head portion by the expansion control signal of the airbag unfolding control part 240, to thus absorb and cushion impact applied to the passenger's head portion during an emergency landing and minimize injuries to the passenger's head and neck portion.

Hereinbelow, a flow of operation of the seat control system configured as described above will be described through one embodiment. FIGS. 12 to 15 are schematic views showing movement in which the passenger is protected by the seat control system of an air vehicle for UAM according to the present disclosure.

Figure 12:
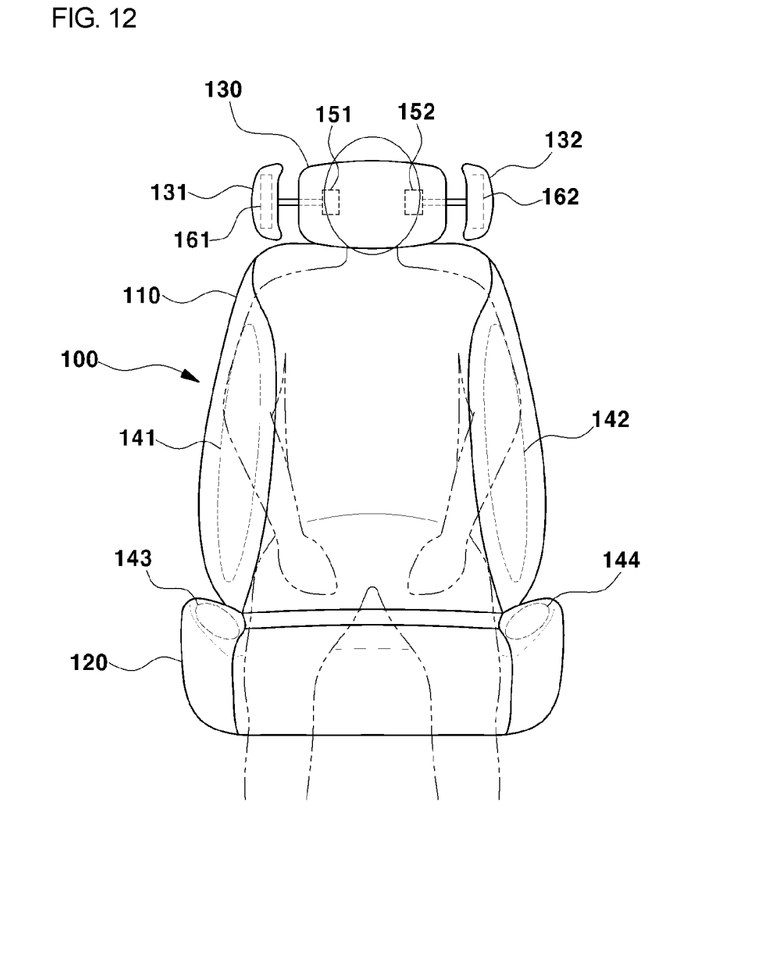
FIGS. 12 to 15 are schematic views showing movement in which the passenger is protected by the seat control system of an air vehicle for UAM according to the present disclosure.

Referring to FIG. 12, when the drone-type VTOL air vehicle for UAM having the multiple rotors is in normal flight, the passenger seated on the seat can position the rear of his/her head to be supported by the headrest 130 or recline while leaning his/her head to the left or the right against the first side pad 131 or the second side pad 132.

Figure 13:
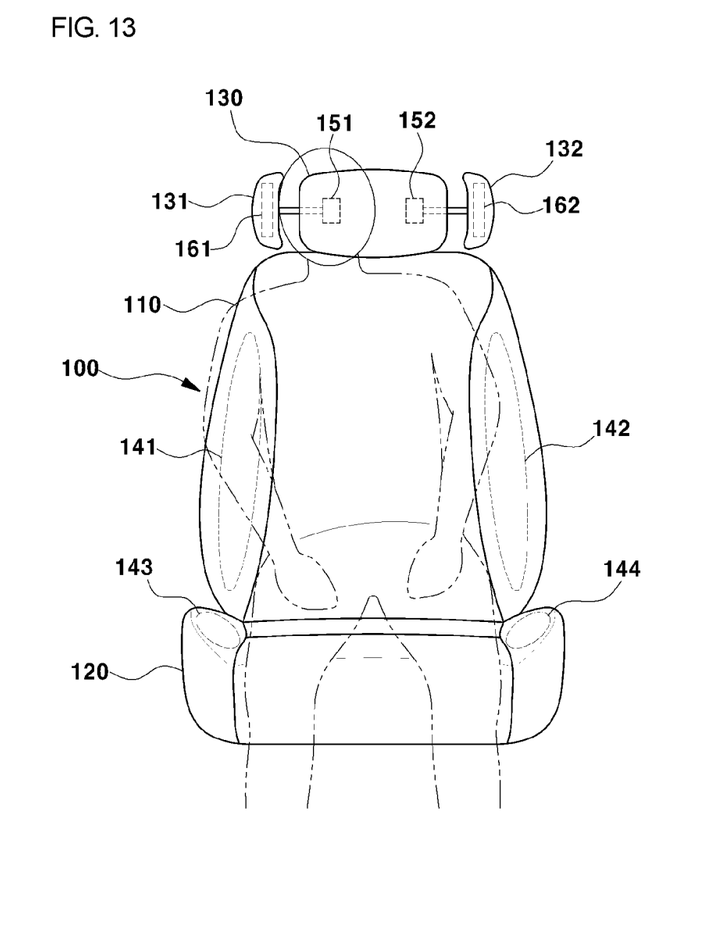

Referring to FIG. 13, when at least one of the multiple rotors is broken, the air vehicle turns strongly in the left direction (direction indicated by arrow in FIG. 13) and simultaneously the passenger's body is tilted to the right and the passenger's head portion is also sharply tilted to the first side pad 131 that is located in the right direction.

At this point, as described above, the rotor failure determination part 210 in the elements of the controller 200 may be configured to determine that at least one of the multiple rotors (e.g., first to fourth rotors) is broken, and determine that the direction of turn of the air vehicle is the left direction based on the yaw rate information, and then the rotor failure determination part 210 may be configured to adjust the drive amount of the first actuator 151 pulling the first side pad 131, to cause the first side pad 131 located at right of the head portion of the passenger seated on the seat to move in the left direction to face the right side of the passenger's head portion.

Figure 14:
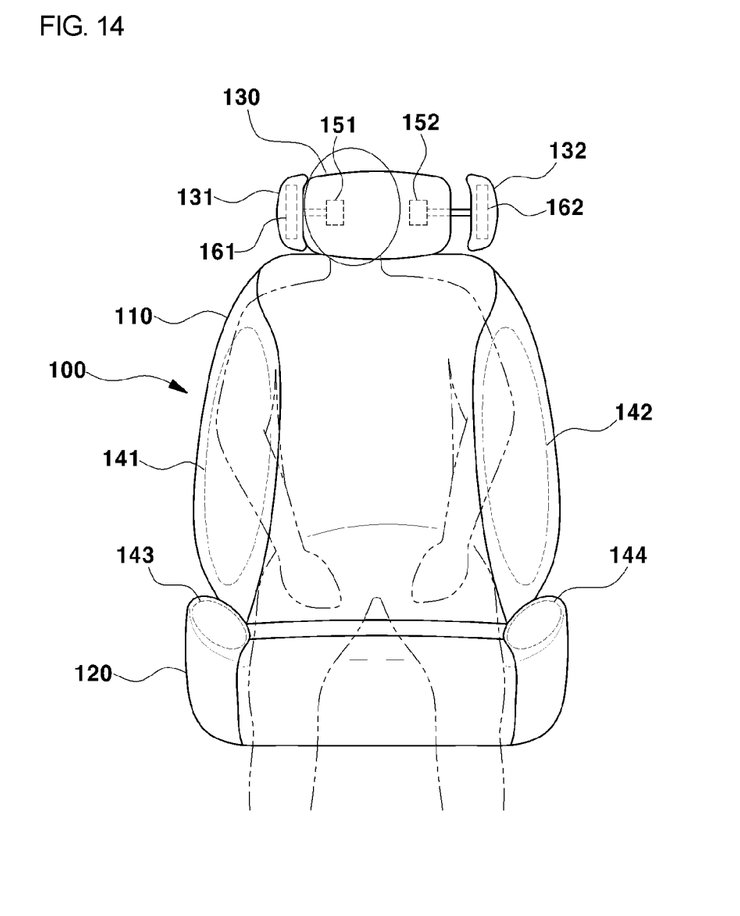

Accordingly, as shown in FIG. 14, the first side pad 131 moves to the left to face the right side of the passenger's head portion by driving of the first actuator 151 and pushes the passenger's head to be straightened, to protect the passenger's head portion and prevent the head portion from being sharply tilted to the right, thereby preventing passengers' injuries caused when the head and neck portion bend.

Meanwhile, when the air vehicle turns strongly to the right due to the rotor failure, the second side pad 132 moves toward the passenger's head portion to be in close contact therewith, to prevent the passenger's head portion from being sharply tilted to one side. Simultaneously, the air cell volume control part 230 may be configured to adjust the drive amount of the air pump 145 to match the expansion pressure determined as described above, to cause the first to fourth air cells 111 to 114 to be expanded.

Accordingly, when the air vehicle turns strongly to the left due to the rotor failure, as shown in FIG. 14, the first air cell 141 and the second air cell 142 embedded in the left and right bolster portions of the seatback 110 are expanded and simultaneously the third air cell 143 and the fourth air cell 144 embedded in the left and right bolster portions of the seat cushion 120 are expanded, so that the passenger's upper and lower body are restrained not to be sharply tilted to the one side and the passenger may be prevented from sustained injuries caused when the passenger's upper and lower body are sharply tilted to one side.

Figure 15:
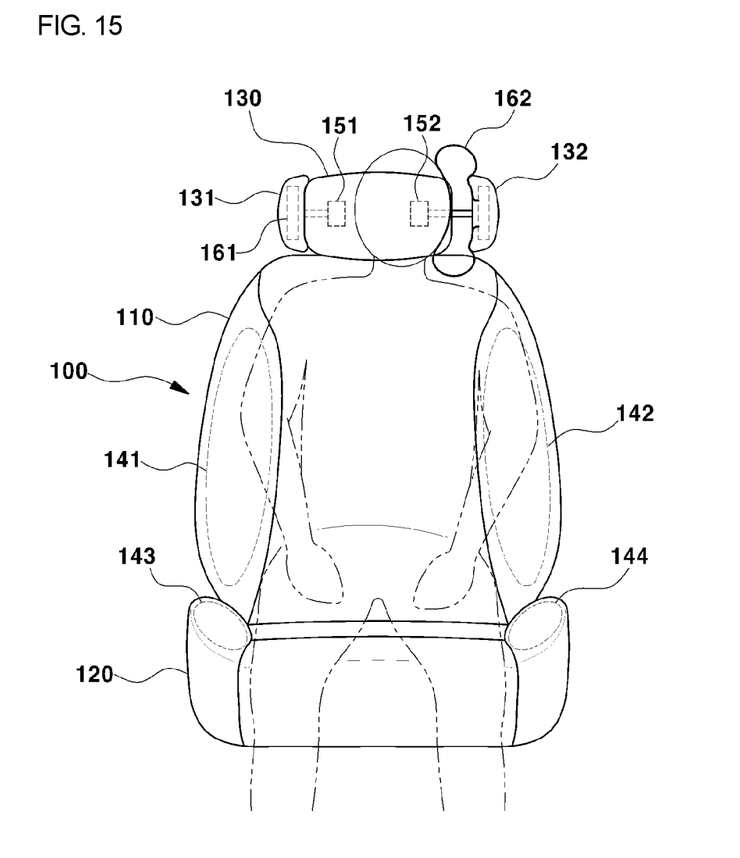

Meanwhile, when the VTOL air vehicle performs an emergency landing due to the rotor failure, at the moment when strongly turned air vehicle (airframe) lands on the ground, the head and the body of the passenger seated on the seat are sharply tilted to the left and great impact energy is applied to the passenger's head and the body in a reverse direction of turn of the air vehicle, as shown in FIG. 15, so injuries may be greatly increased.

The airbag unfolding control part 240 may be configured to determine the moment when the air vehicle performs an emergency landing as described above, and control expansion of the second airbag 162. Accordingly, as shown in FIG. 15, the second airbag 162 embedded in the second side pad 132 may be unfolded toward the left side of the passenger's head portion by an unfolding control signal of the airbag unfolding control part 240, whereby an impact applied to the passenger's head portion may be absorbed and cushioned and injuries to the passenger's head and neck portion may be minimized during an emergency landing.

Although the embodiment of the present disclosure has been described in detail above, the embodiment described in the specification and the configurations illustrated in the drawings is merely an example and the scope and spirit of the present disclosure are not limited to the embodiment described hereinabove. Furthermore, various modifications and improvements of those skilled in the art which uses the basic concept of the present disclosure defined by the appended claims are also included in the scope and spirit of the present disclosure.

What is claimed is:

1. A seat control system of an air vehicle for urban air mobility (UAM), the air vehicle comprising multiple rotors, the seat control system comprising:
   a seat mounted in the air vehicle for UAM;
   a plurality of air cells embedded in the seat and formed to be expandable;
   a first side pad connected to a left portion of a headrest of the seat, wherein the first side pad is configured to perform rectilinear reciprocating motion in left and right directions;

a second side pad connected to a right portion of the headrest, wherein the second side pad is configured to perform rectilinear reciprocating motion in left and right directions;

a first airbag embedded in the first side pad and formed to be unfoldable;

a second airbag embedded in the second side pad and formed to be unfoldable; and a controller configured to perform expansion control for the plurality of air cells, moving control for the first side pad or the second side pad, and unfolding control for the first airbag or the second airbag.

2. The seat control system of claim 1, wherein the plurality of air cells includes:

a first air cell and a second air cell respectively embedded in left and right bolster portions of a seatback; and a third air cell and a fourth air cell respectively embedded in left and right bolster portions of a seat cushion.

3. The seat control system of claim 2, wherein an air pump is connected to the plurality of air cells, the air pump being configured to be operated by a command signal of the controller.

4. The seat control system of claim 1, wherein a first actuator is embedded in a first side portion of the headrest and connected to the first side pad, the first actuator being configured to pull the first side pad toward a head portion of a passenger during rotor failure.

5. The seat control system of claim 1, wherein a second actuator is embedded in a second side portion of the headrest and connected to the second side pad, the second actuator being configured to pull the second side pad toward a head portion of a passenger during rotor failure.

6. The seat control system of claim 1, wherein the controller includes:

a rotor failure determination part configured to determine whether at least one of the multiple rotors is in a failure condition based on present flight information of the air vehicle;

a side pad position control part configured to determine a direction of turn of the air vehicle during rotor failure and to operate the first side pad or the second side pad to move toward a head portion of a passenger;

an air cell volume control part configured to output a command signal for expansion of each air cell to an air pump during rotor failure; and an airbag unfolding control part configured to execute unfolding of the first airbag or the second airbag during an air vehicle emergency landing due to rotor failure.

7. The seat control system of claim 6, wherein the rotor failure determination part is configured to determine that some rotors of the multiple rotors are in the failure condition, in response to determining that a steering angle for flight of the air vehicle is less than a reference steering angle, velocity of the some rotors of the multiple rotors is less than a reference value, and yaw rate of the air vehicle is greater than a reference.

8. The seat control system of claim 7, wherein the side pad position control part is configured to adjust a drive amount of a first actuator for pulling the first side pad positioned at right of a head portion of the passenger to cause the first side pad to move in a left direction toward a right side of the head portion of the passenger, in response to the side pad position control part determining that the air vehicle turns to the left due to failure of any one of the multiple rotors.

9. The seat control system of claim 8, wherein the side pad position control part is configured to determine a leftward moving distance ($D_R$) of the first side pad by a value obtained by multiplying a value ($Avz/Avz_{max}$) obtained by dividing present yaw rate by maximum yaw rate, gain ($K_{Avz}$), and a maximum moving distance ($D_{max}$).

10. The seat control system of claim 7, wherein the side pad position control part is configured to adjust a drive amount of a second actuator for pulling the second side pad positioned at left of a head portion of the passenger to cause the second side pad to move in the right direction toward a left side of the head of the passenger, in response to the side pad position control part determining that the air vehicle turns to the right due to failure of any one rotor of the multiple rotors.

11. The seat control system of claim 10, wherein the side pad position control part is configured to determine a rightward moving distance ($D_L$) of the second side pad by a value obtained by multiplying a value ($Avz/Avz_{max}$) obtained by dividing present yaw rate by maximum yaw rate, gain ($K_{Avz}$), and a maximum moving distance ($D_{max}$).

12. The seat control system of claim 7, wherein the air cell volume control part is configured to receive a rotor failure signal from the rotor failure determination part to determine expansion pressure of first to fourth air cells in proportion to yaw rate, and to output a driving signal for expanding the first to fourth air cells to the air pump.

13. The seat control system of claim 12, wherein the air cell volume control part is configured to determine the expansion pressure ($P_n$) of the first to fourth air cells by a value obtained by multiplying a value ($Avz/Avz_{max}$) obtained by dividing present yaw rate by maximum yaw rate, gain for tuning ($K_{Pn}$), and maximum air cell expansion pressure ($P_{max}$).

14. The seat control system of claim 7, wherein the airbag unfolding control part is configured to receive a rotor failure signal from the rotor failure determination part to determine the moment of an air vehicle emergency landing, and operate the first airbag or the second airbag to be unfolded toward the head portion of the passenger.

15. The seat control system of claim 14, wherein the airbag unfolding control part is configured to determine that a present point is the moment when the air vehicle performs an emergency landing, in response to determining that present yaw rate ($Avz$) is greater than preset reference yaw rate ($Avz_{spin}$), present rotary angular acceleration ($Tz$) is greater than preset reference rotary angular acceleration ($Tz_{Threshold}$), present angular acceleration jerk ($\Delta Tz$) is greater than preset reference angular acceleration jerk ($\Delta Tz_{Threshold}$), present lateral acceleration ($Ay$) is greater than preset reference lateral acceleration ($Ay_{Threshold}$), and present lateral acceleration jerk ($\Delta Ay$) is greater than preset lateral acceleration jerk ($\Delta Ay_{Threshold}$).

* * * * *